United States Patent
Ishii et al.

(10) Patent No.: US 8,597,707 B2
(45) Date of Patent: *Dec. 3, 2013

(54) INSTANT NOODLES AND METHOD FOR PRODUCING THE SAME

(75) Inventors: Yuji Ishii, Osaka (JP); Kunihiko Yoshida, Osaka (JP); Rintaro Takahashi, Osaka (JP); Takeshi Asahina, Osaka (JP); Yoshifumi Miyazaki, Osaka (JP); Mitsuru Tanaka, Osaka (JP)

(73) Assignee: Nissin Foods Holdings Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/502,919

(22) PCT Filed: Mar. 3, 2010

(86) PCT No.: PCT/JP2010/001459
§ 371 (c)(1),
(2), (4) Date: Apr. 19, 2012

(87) PCT Pub. No.: WO2011/077600
PCT Pub. Date: Jun. 30, 2011

(65) Prior Publication Data
US 2012/0207897 A1    Aug. 16, 2012

(30) Foreign Application Priority Data
Dec. 22, 2009   (JP) ................. 2009-291330

(51) Int. Cl.
*A23L 1/162*   (2006.01)

(52) U.S. Cl.
USPC ........... 426/557; 426/451; 426/506; 426/508; 426/510

(58) Field of Classification Search
USPC ................. 426/557, 451, 506, 508, 510
See application file for complete search history.

(56) References Cited

U.S. PATENT DOCUMENTS

| | | | |
|---|---|---|---|
| 5,500,236 A * | 3/1996 | Miller et al. ................. | 426/451 |
| 5,599,573 A | 2/1997 | Barnes et al. | |
| 8,236,363 B2 * | 8/2012 | Miyazaki et al. ............ | 426/451 |

FOREIGN PATENT DOCUMENTS

| | | |
|---|---|---|
| CN | 1140558 | 1/1997 |
| JP | 56-37776 | 9/1981 |
| JP | 63-56787 | 11/1988 |
| JP | 2-39228 | 9/1990 |
| JP | 11-266813 | 10/1999 |
| JP | 2000-245377 | 9/2000 |
| JP | 2003-038114 | 2/2003 |
| JP | 2003-174853 | 6/2003 |
| JP | 3535145 | 3/2004 |
| JP | 4070148 | 4/2008 |
| JP | 4438969 | 3/2010 |
| WO | 99/65331 | 12/1999 |

OTHER PUBLICATIONS

"Sokuseki Men Kakusha no Doko Nisshin Shokuhin Zen Men Kakumei de Hinshitsu Kyoka ni Hakusha", Japan Food Journal, Sep. 30, 2009, p. 7, together with a partial translation thereof.
Reiji Tomita, "Nisshin Shokuhin, Shin Gijutsu de Sai Futomen Jitsugen Shin Brand 'Futomen Dodo' Sai 1 Dan Hatsubai", Japan Food Journal , Nov. 27, 2009, p. 2, together with a partial translation thereof.
"Maker Doko Nisshin Shokuhin Core Brand ni Churyoku 'Futomen Dodo' o Shijo Donyu", Japan Food Journal, Dec. 7, 2009, p. 9, together with a partial translation thereof.
Official Action for corresponding application JP 2009-291330, issue date Mar. 26, 2010, and English language translation thereof.
Official Action for corresponding application JP 2009-291330, issue date Jun. 25, 2010, and English language translation thereof.
Search report from E.P.O., mail date is Nov. 2, 2012.

* cited by examiner

*Primary Examiner* — Lien T Tran
(74) *Attorney, Agent, or Firm* — Greenblum & Bernstein, P.L.C.

(57) ABSTRACT

The present invention provides a method for producing instant noodles which have an excellent reconstitution property and excellent taste and texture and can be reconstituted by pouring boiling water even if the noodles are thicker than before. In the method for producing the instant noodles, a noodle belt is extremely strongly rolled out once or more at a rolling rate of 60% or higher in a noodle belt rolling step, raw noodle strings are obtained from the noodle belt, superheated steam is sprayed to the obtained raw noodle strings, moisture is supplied or not supplied to the noodle strings, the noodle strings are steamed by saturated steam or superheated steam or are boiled to realize gelatinization, and the noodle strings are dried after the gelatinization.

8 Claims, No Drawings

INSTANT NOODLES AND METHOD FOR PRODUCING THE SAME

TECHNICAL FIELD

The present invention relates to a method for producing instant noodles having an improved reconstitution property and the instant noodles produced by this method.

BACKGROUND ART

Instant noodles are produced by gelatinizing cut raw noodle strings and then drying the noodle strings by frying, hot-air drying, freeze dry, or the like. The instant noodles can be reconstituted and easily eaten only by pouring boiling water and leaving the noodles for about three to five minutes or by boiling and cooking the noodles for about one to three minutes. Thus, the instant noodles are extremely convenient instant foods.

However, thick noodle strings are not easily reconstituted. The thick noodles are not reconstituted only by pouring the boiling water and leaving the noodles for three to five minutes, and cores of the noodles remain uncooked. Therefore, it is necessary to reduce the thickness of the noodle. On this account, even if the noodles are thick, the thickness thereof after the reconstitution is about 1.4 mm at most, and the shapes thereof are flat noodle shapes. Thus, he/she cannot fully enjoy the smooth feeling of noodles passing through his/her throat. Here, there is a need for a technology of being able to reconstitute thicker noodles in boiling water.

In addition, if the reconstitution property of thin noodle strings is improved, the wait time before eating can be further shortened. A technology of improving the reconstitution in boiling water is useful also for the instant noodles of thin noodle strings. As above, the improvement of the reconstitution property of the instant noodles is an extremely important problem in the instant noodle technology, and an extremely large number of technologies for solving this problem are known.

Although there are a large number of conventional technologies, actually, the instant noodles eaten by pouring the boiling water, even the thick fried noodles, each has a width of about 5.0 mm and a thickness of about 1.4 mm when reconstituted, that is, is thin and is in the flat noodle shape. This indicates that: effects of these conventional technologies are not enough; or even if the improvement effect of the reconstitution property is obtained, taste and texture are adversely affected, and these conventional technologies have limitations.

Under these circumstances, the present inventors have diligently studied to develop a technology in which even thicker instant noodles than before can be eaten by pouring the boiling water, and noodle quality and the like are not adversely affected. As a result, the present inventors have found that the reconstitution property dramatically improves by extremely strongly rolling out a noodle belt in a noodle belt rolling step of a noodle making step and spraying superheated steam to the obtained raw noodle strings. Thus, the present invention was made.

One example of conventional technologies in which the extremely strong rolling is performed in an instant noodle producing step is PTL 1, and examples of conventional technologies in which the raw noodle strings are subjected to the superheated steam are PTLs 2 to 5.

Although each of these conventional technologies describes the effects, such as "good reconstitution property", "shortening of time for reconstitution in boiling water", and the like, the level of improvement of the reconstitution property is much lower than a target level of the present invention.

CITATION LIST

Patent Literature

PTL 1: Japanese Laid-Open Patent Application Publication No. 2000-245377
PTL 2: Japanese Examined Patent Application Publication No. 56-37776
PTL 3: Japanese Examined Patent Application Publication No. 63-56787
PTL 4: Japanese Examined Patent Application Publication No. 2-39228
PTL 5: Japanese Patent No. 3535145

SUMMARY OF INVENTION

Technical Problem

An object of the present invention is to produce instant noodles, which have an excellent reconstitution property and can be reconstituted by pouring boiling water and have excellent taste and texture even if the noodles are thicker than before, that is, to provide instant noodles and a method for producing the instant noodles, each of which can realize reconstitution without adversely affecting the noodle quality and the noodle making property even if the noodles are extremely thick and can make him or her enjoy a "deep and smooth feeling of noodles passing through his/her throat" which cannot be felt by eating conventional instant noodles.

Solution to Problem

As above, the present inventors have found that the instant noodles which can be adequately reconstituted in three to five minutes after pouring the boiling water can be obtained by: spraying the superheated steam to the raw noodles obtained by strongly rolling out the noodle belt; gelatinizing the obtained noodle strings; and drying the strings, even if the instant noodles are thick instant noodles which cannot be conventionally reconstituted. In addition, the present inventors have found that such instant noodles can be produced without adversely affecting the noodle quality and the noodle making property. Thus, the present invention was made.

That is, the present invention is a method for producing instant noodles, including: a noodle making step (a) of cutting a noodle belt to obtain raw noodle strings, the noodle belt being rolled out once or more at a rolling rate of 60% or higher; a step (b) of spraying superheated steam to the obtained raw noodle strings; a step (c) of performing gelatinization of the noodle strings to which the superheated steam has been sprayed; and a step (d) of drying the noodle strings after the gelatinization.

In the present invention, the rolling rate is defined as below.

Rolling Rate(%)=(Thickness of Noodle Belt Before Rolling−Thickness of Noodle Belt After Rolling)/Thickness of Noodle Belt Before Rolling To be specific, the rolling at the rolling rate of 60% or higher is extremely strong rolling by which the thickness of the noodle belt having a thickness of, for example, 100 becomes 40 or smaller. In the present invention, the strong rolling at the rolling rate of 60% or higher is performed once or more when forming the noodle belt. The rolling at the rolling rate of 60% or higher may be any one of a plurality of rolling operations performed when forming the noodle belt or may be performed plural times.

Moreover, in the present invention, the "superheated steam" denotes "saturated steam heated up to 100° C. or higher under atmospheric pressure", and "spraying the superheated steam" denotes "emitting the superheated steam through an emission hole in a steam chamber to cause the superheated steam to contact the noodle strings".

The method of the present invention has to include the steps (a) to (d). However, in the step (c) that is a gelatinization step, boiling, steaming by the saturated steam, or steaming by the superheated steam or the saturated steam while supplying moisture may be used. Among these, a preferable method is to: supply moisture in liquid form to the noodle strings, obtained by spraying the superheated steam to the raw noodle strings in the step (b), to increase a moisture content of the noodle strings; and heat the noodle strings, whose moisture content has been increased, by the superheated steam or saturated steam to realize the gelatinization.

A further preferable method is to: supply moisture in liquid form to the noodle strings, obtained by spraying the superheated steam to the raw noodle strings in the step (b), to increase a moisture content of the noodle strings; heat the noodle strings, whose moisture content has been increased, by the superheated steam; and repeat a treatment, in which the moisture is supplied to the noodle strings and the noodle strings are heated by the superheated steam, once or more to realize the gelatinization. As above, by repeating the supply of the moisture in liquid form and the heating by the superheated steam plural times, heat and water can be adequately supplied to the insides of even thick noodles. Thus, the reconstitution property further improves.

As with the step (b), by spraying the superheated steam to the noodle strings in the step (c), a larger amount of heat can be applied to the noodle strings, which is preferable. In a case where the moisture supply and the heating by the superheated steam are repeated in the step (c), one of the following two methods may be used, which are a method in which while the superheated steam spraying is being stopped, the moisture is supplied to the noodle strings by immersion or shower and a method in which while the superheated steam is being continuously sprayed, the moisture is intermittently supplied to the noodle strings by shower or the like. The steps (b) and (c) can be continuously performed by the latter method. In this case, the spraying of the superheated steam to the raw noodle strings before the first water shower corresponds to the step (b).

Moreover, it is desirable that when spraying the superheated steam to the raw noodle strings in the step (b), the amount of heat applied to the noodle strings be large. It is preferable that the temperature to which the surfaces of the noodle strings are exposed be 125 to 220° C. If the surfaces of the noodle strings dry while the superheated steam is being sprayed to the raw noodles, the subsequent progress of the gelatinization becomes inadequate, and the noodle strings become a burned state. Here, it is preferable that the superheated steam be sprayed for a time in which the noodle string moisture (including the moisture adhered to the surfaces of the noodles) which has increased in amount once by the spraying of the superheated steam does not become equal in amount to or smaller in amount than the moisture of the raw noodle strings by the drying due to the high amount of heat of the superheated steam. A time for spraying the superheated steam is about 5 to 50 seconds, especially preferably about 15 to 45 seconds.

Moreover, in the present invention, it is preferable that the noodle belt in the step (a) contain phosphate and/or carbonate. The effect of the reconstitution property further improves by adding the phosphate. Monophosphate and polymer phosphate can be used as the phosphate. The amount of phosphate added is preferably about 2 to 15 g per 1 kg of noodle raw material powder containing wheat flour, starch, and the like.

Moreover, by producing the instant noodles of the present invention by any of the producing methods of the present invention, the instant noodles can be reconstituted by pouring the boiling water even if the instant noodles are thick. Moreover, the thickness of the noodles immediately after the reconstitution can exceed 1.5 mm which cannot be realized by conventional instant noodles. Further, the instant noodles of the present invention have an excellent noodle quality.

Advantageous Effects of Invention

In accordance with the present invention, it is possible to obtain the instant noodles which have an excellent reconstitution property and can be reconstituted up to core portions of the noodles by pouring the boiling water even if the noodles are thicker than before. Therefore, he/she can enjoy deep and smooth texture of noodles passing through his/her throat, the texture being not obtained by conventional instant noodles.

In addition, even if the noodles are extremely thick, the taste, texture, noodle making property, and the like are not adversely affected.

The present inventors estimates that the present invention can achieve such high improvement effect of the reconstitution property due to the following synergy effect.

To be specific, by spraying the high-temperature superheated steam to the raw noodle strings, the surfaces of the noodle strings get wet once, and the moisture on the surfaces boils by an extremely large amount of heat. At this time, starch particles on the surfaces of the noodle strings break, and water easily penetrates the starch particles. In the case of the steaming by the saturated steam or the boiling, the temperature on the surface of the noodle is lower than 100° C. Such intense boiling state on the surface of the noodle is specific to the superheated steam.

In addition, since the noodle strings are extremely strongly rolled out when forming the noodle belt, air in the noodle dough are pushed out, so that the insides of the noodle strings have good heat conductivity. Therefore, the heat is easily conducted to the core portions of the noodle strings at the time of the superheated steam spraying and the gelatinization. Further, since the noodle belt is formed by the strong rolling, the formation of a gluten structure is inadequate, and water easily passes through the noodle belt. By the combination of the structure obtained by the strong rolling and the structure obtained by spraying the superheated steam to the raw noodle strings, a larger amount of heat and water can be supplied to the core portions of the noodle strings more quickly. It is thought that the reconstitution property dramatically improves by the cooperation of the action by the superheated steam and the special noodle string structure obtained by the strong rolling.

DESCRIPTION OF EMBODIMENTS

Hereinafter, the present invention will be explained in detail in accordance with producing steps.

One feature of steps until raw noodle strings are obtained is that in a common raw noodle making method, the noodle belt is strongly rolled out at least once at a rolling rate of 60% or higher as a noodle belt rolling method.

First, preferably phosphate (monophosphate, polymer phosphate) and/or carbonate are added to a main raw material, such as wheat flour or starch, and auxiliary raw materials, such as salt, brine water, thickener, gluten, and pigment, are further added according to need. This mixture and kneading water are kneaded. The auxiliary raw material may be added to the main raw material together with the kneading water, or the auxiliary raw material in powder form may be added to the main raw material. The amount of kneading water significantly changes depending on the amount of starch added and is about 350 to 450 ml. A large amount of kneading water may be added to form a highly hydrated noodle dough. Various phosphates, such as monosodium phosphate, trisodium phosphate, sodium pyrophosphate, and sodium polyphosphate, may be used, and the amount of phosphate added is preferably about 2 to 15 g.

The noodle dough obtained as above is rolled out and shaped to form a noodle belt. Next, the noodle belt is rolled out plural times to finally form a thin noodle belt. In the present invention, the noodle belt is strongly rolled out at the rolling rate of 60% or higher at least once out of the above plural times. In accordance with a conventional theory regarding the rolling, the strong rolling (drastic rolling) is said to be not preferable since it damages tissues of gluten in the noodle strings (see "Foods and Chemistry" 1987 Extra Issue No. 51). However, in the present invention, the rolling is performed at the rolling rate of 60% or higher, preferably about 70 to 85%.

There is a case where after a plurality of noodle belts are formed, these noodle belts are combined and rolled out to form one noodle belt. In this case, the rolling at the rolling rate of 60% or higher may be performed after the plurality of noodle belts are combined into one noodle belt, or the plurality of noodle belts may be stacked on one another after each of the plurality of noodle belts is rolled out at the rolling rate of 60% or higher. Further, the rolling at the rolling rate of 60% or higher may be performed with respect to each of the noodle belts and the stacked noodle belts.

The noodle belt rolled out as above finally obtains a predetermined thickness and then is cut into noodle strings by a cut roll. In the present invention, thicker noodle strings than before can be reconstituted without deteriorating the noodle quality.

Superheated steam is sprayed to the raw noodle strings produced by the noodle making method in which the above strong rolling is performed. In this spraying step, in order to apply as large amount of heat as possible to the surfaces of the noodle strings, it is preferable to spray the superheated steam such that the temperature of the superheated steam with which the noodle strings contact is about 125 to 220° C., preferably about 140 to 180° C. As above, when the superheated steam is sprayed to the raw noodle strings, the surfaces of the noodle strings get wet once, and then the steam boils.

However, since the superheated steam is high in temperature, that is, 100° C. or higher, the noodle strings dry by spraying the superheated steam to the noodle strings for a long period of time. If the moisture on the surfaces of the noodle strings evaporate and the strings dry, the effects of the present invention cannot be obtained. Therefore, the spraying of the superheated steam is terminated such that preferably, the amount of moisture (including the moisture on the surfaces of the noodles) of the noodle strings does not become smaller than the amount of moisture of the raw noodles. The spraying time varies depending on the temperature of the superheated steam, the volume of air, and the thickness of the noodle string but is about 5 to 50 seconds, preferably 15 to 45 seconds.

Saturated steam can be sprayed to the noodle strings at the same time as the spraying of the superheated steam. Specifically, a superheated steam emission port is formed separately from a saturated steam emission port in a tank in which the saturated steam is filled, and the superheated steam is sprayed to the noodle strings through the superheated steam emission port. Thus, the superheated steam and the saturated steam can be used at the same time.

Only spraying the superheated steam to the raw noodle strings is inadequate to realize the gelatinization of the noodle strings. As long as the noodle strings are not extremely thin, the instant noodles which can be reconstituted by, for example, pouring the boiling water cannot be obtained even by drying such noodle strings to which only the superheated steam has been sprayed. Here, a step of adequately gelatinizing the noodle strings is required. If the noodles are thin, they can be steamed by the saturated steam or can be boiled. However, in order to further improve the reconstitution property or to realize thick noodles, it is preferable to cause the raw noodles, to which the superheated steam is sprayed, to absorb moisture in liquid form to increase the moisture content of the noodles and then to steam the noodles by the superheated steam or the saturated steam.

In the moisture supplying step performed here, the noodles obtained by spraying the superheated steam to the raw noodles are supplied with the moisture in liquid form by, for example, water shower or water immersion. Herein, the water may be cold water, hot water, or boiling water. If the water is low in temperature, the temperature of the noodle string decreases, and the heat efficiency deteriorates. Therefore, the temperature of the water is set to 40° C. or higher, especially preferably 50° C. or higher. The moisture may be supplied such that the weight of the noodles before the moisture supply increases about 5 to 30%. A small amount of seasoning, emulsifier, anti-binding agent, and the like may be dissolved in the water.

Herein, the moisture may be supplied to the noodle strings, obtained by spraying the superheated steam to the raw noodle strings, after taking out the noodle strings from a steam chamber to outside once or after stopping spraying the superheated steam to the raw noodle strings once. However, in the case of using the superheated steam in the gelatinization performed after the moisture supply, the superheated steam can be continuously sprayed to the noodle strings in the steam chamber in which the superheated steam has been spayed to the raw noodles, and the moisture can be supplied to the noodles by, for example, the water shower without stopping the spraying of the superheated steam. In accordance with this method, a treatment after the moisture supply corresponds to a gelatinization step of the present invention, the gelatinization step being performed after spraying the superheated steam to the raw noodle strings.

In the steaming for the gelatinization of the noodle strings after the moisture supply, the saturated steam may be used when the noodle strings are not thick. However, it is preferable to use the superheated steam when the noodle strings are thick or for obtaining a further higher effect of the improvement of the reconstitution property. However, by using the superheated steam, the noodle strings gradually dry. If the noodle strings dry out, the effect of the improvement of the reconstitution property does not proceed. Therefore, in the case of using the superheated steam, it is preferable to intermittently supply the moisture in liquid form. That is, when the noodles are thick, the superheated steam is sprayed to the raw noodle strings, and water supply and superheated steam spraying are then alternately performed. This is repeated plural times, preferably twice or more.

In this case, the conditions of the superheated steam may be the same as those when the superheated steam is sprayed to the raw noodle strings or may be different from those in that the temperature is changed. However, in order to prevent the noodle strings from drying, to be specific, in order to prevent the amount of moisture (including the moisture on the surfaces of the noodles) of the noodle strings during the steaming from becoming smaller than the moisture content of the original raw noodles, the time for steaming once by the superheated steam is preferably about 5 to 50 seconds, further preferably about 15 to 45 seconds. The steaming using the saturated steam may be performed after the superheated steam spraying and the moisture supply are repeated several times, or the gelatinization may be terminated only by the repetition of the superheated steam spraying and the moisture supply. Moreover, short-time boiling may be performed after the steaming. In the case of using the superheated steam, the saturated steam may also be used in the same manner as when spraying the superheated steam to the raw noodles.

Any drying method used to dry the normal instant noodles may be used to dry the noodle strings after the gelatinization. Specifically, fry drying, hot-air drying, microwave drying, freeze dry, and the like may be used alone or in combination. Here, the fry drying is the most advantageous from the viewpoint of the realization of the reconstitution of thick noodle strings. The fry drying is performed at about 130 to 160° C. for about one to three minutes. The hot-air drying is performed at about 60 to 120° C. for about 20 minutes to three hours.

The instant noodles of the present invention produced as above are applicable to a cup noodle which can be eaten just by pouring the boiling water and waiting for about three to five minutes and a package of instant noodles which are boiled and cooked for about one to three minutes. In both cases, the excellent reconstitution property and the high noodle quality can be obtained. Although the present invention is applicable to both thick noodles and thin noodles, it is especially effective for the thick noodles. This is because the reconstitution property is extremely good, and the highest effect is achieved in the case of thick noodle strings. Thus, he/she can enjoy deep and smooth feeling of noodles passing through his/her throat, and conventional instant noodle products do not provide such feeling.

EXAMPLES

Hereinafter, the present invention will be explained in more details using Examples. However, the present invention is not limited to Examples below.
Experiment 1

Example 1

Strong Rolling and Superheated Steam 430 ml of kneading water in which 20 g of salt and 5 g of phosphate (monophosphate:polymer phosphate=2:3) were dissolved was added to 1 kg of main raw material powder containing 750 g of wheat flour and 250 g of starch. This was adequately kneaded with a mixer to obtain a noodle dough. The obtained noodle dough was shaped in the form of a noodle belt having a thickness of about 12 mm.

As the first rolling, the noodle belt was strongly rolled out at the rolling rate of 79% by using a rolling machine. Next, the noodle belt was rolled out four more times at the rolling rate of about 10 to 50% by using the rolling machine such that the thickness of the reconstituted noodle string became 1.3 to 2.0 mm. This noodle belt was cut by using a square blade No. 9 cutting blade roll to obtain the raw noodle strings.

While the raw noodle strings were being conveyed by a net conveyor, the superheated steam was sprayed to the noodle strings in a tunnel-shaped steam chamber. As the conditions of the superheated steam, the steam flow rate was 160 kg/h, and the temperature monitored by a temperature sensor disposed on the surface of the noodle string was about 140° C.

After the superheated steam was sprayed to the noodle strings in the steam chamber for 30 seconds, the noodle strings were immediately discharged to the outside, and the moisture was supplied to the noodle strings by showering them with 2% salt water of about 60° C. for 40 seconds. Next, the noodle strings were immediately conveyed into the tunnel-shaped steam chamber, and again, the noodle strings were subjected to the steaming such that the superheated steam was sprayed to the noodle strings at the steam flow rate of 160 kg/h and the temperature of about 140° C. for 30 seconds. Further, the noodle strings were discharged to the outside of the steam chamber, and again, the moisture was supplied to the noodle strings by showering them with the 2% salt water of about 60° C. for 40 seconds. Then, the noodle strings were immediately conveyed into the tunnel-shaped steam chamber, and again, the noodle strings were subjected to the steaming such that the superheated steam was sprayed to the noodle strings at the steam flow rate of 160 kg/h and the temperature of about 140° C. for 30 seconds. Thus, the gelatinization was performed.

The noodle strings were immersed in a boiling chamber of 90° C. for five seconds and next immersed in a loosening liquid for five seconds. Then, the noodle strings were cut, and 150 g of the noodles as one meal were filled in a retainer having a capacity of 380 ml. Next, the noodles were fried in a palm oil of about 150° C. for two minutes to be dried. The instant fried noodles produced as above were cooled and stored as a sample of Example 1.

Comparative Example 1

Normal Rolling and Saturated Steam

In Comparative Example 1, the following common rolling method was used instead of the rolling method used in the producing method of Example 1, and only the saturated steam was used without using the superheated steam.

To be specific, the noodle dough obtained by kneading with the mixer and having the same composition as in Example 1 was shaped to form the noodle belt having a thickness of about 12 mm. Then, the noodle belt was rolled out five times by consecutively arranged rolling machines at the rolling rate of about 10 to 50% such that the thickness of the reconstituted noodle string became 1.3 to 2.0 mm that was the same as Example 1. This noodle belt was cut by using the square blade No. 9 cutting blade roll to obtain the raw noodle strings.

Next, while the raw noodle strings obtained by the normal rolling were being conveyed by the net conveyor, they were subjected to the steaming in the tunnel-shaped steam chamber in which the saturated steam was sprayed and filled. As the conditions of the saturated steam, the steam flow rate was 240 kg/h, and the temperature monitored by the temperature sensor disposed on the surface of the noodle string was about 100° C. The steaming was performed for 120 seconds. Thus, the gelatinization was performed.

The subsequent steps were the same as those in Example 1.

Comparative Example 2

Strong Rolling and Saturated Steam

In Comparative Example 2, the same strong rolling as in the producing method of Example 1 was used, and only the saturated steam was used as with Comparative Example 1 without using the superheated steam.

To be specific, the raw noodle strings produced in the same manner as in Example 1 were gelatinized by using the same saturated steam as in Comparative Example 1. Specifically, while the raw noodle strings produced by the same strong rolling as in Example 1 were being conveyed by the net conveyor, they were subjected to the steaming in the tunnel-shaped steam chamber in which the saturated steam was sprayed and filled. As the conditions of the saturated steam, the steam flow rate was 240 kg/h, and the temperature monitored by the temperature sensor disposed on the surface of the noodle string was about 100° C. The steaming was performed for 120 seconds. Thus, the gelatinization was performed.

The subsequent steps were the same as those in Example 1.

Comparative Example 3

Normal Rolling and Superheated Steam

In Comparative Example 3, the same normal rolling as in Comparative Example 1 was used instead of the rolling of Example 1, and the same superheated steam as in Example 1 was used.

To be specific, the noodle dough obtained by kneading with the mixer and having the same composition as in Example 1 was shaped to form the noodle belt having a thickness of about 12 mm. Then, the noodle belt was rolled out five times by the rolling machine at the rolling rate of about 10 to 50%, and the final thickness of the noodle belt was adjusted such that the thickness of the reconstituted noodle string became 1.3 to 2.0 mm as with Example 1. This noodle belt was cut by using the square blade No. 9 cutting blade roll to obtain the raw noodle strings.

The raw noodle strings were subjected to the superheated steam spraying and the moisture supply as with Example 1. Thus, the gelatinization was performed.

The subsequent steps were the same as those in Example 1.

The reconstitution properties of the instant fried noodles produced in Example 1 and Comparative Examples 1 to 3 were compared by: respectively putting the fried noodles in styrol cup containers; pouring 400 ml of boiling water to each of the containers; covering the containers and leaving them for five minutes; adequately mixing the noodles; and eating them. Five expert panelists determined by majority vote which grade mentioned below is appropriate for each noodle.

Best: Noodles and their cores were adequately reconstituted and were in good condition.

Good +: Noodles and their cores were adequately reconstituted but were reconstituted a bit too much.

Good −: Cores were slightly hard but were reconstituted.

NG: Cores were not reconstituted.

TABLE 1

|  | Thickness of reconstituted noodle (mm) | | | | | | | |
| --- | --- | --- | --- | --- | --- | --- | --- | --- |
|  | 1.3 | 1.4 | 1.5 | 1.6 | 1.7 | 1.8 | 1.9 | 2.0 |
| Example 1 (strong rolling and superheated steam) | Good+ | Good+ | Good+ | Good+ | Best | Best | Best | Best |
| Comparative Example 1 (normal rolling and saturated steam) | NG | NG | NG | NG | NG | NG | NG | NG |
| Comparative Example 2 (strong rolling and saturated steam) | Best | Good− | NG | NG | NG | NG | NG | NG |
| Comparative Example 3 (normal rolling and superheated steam) | Good+ | Good+ | Best | Best | Best | Good− | Good− | Good− |

As shown in Table 1, as compared to the normal (conventional) producing method (Comparative Example 1), in a case (Comparative Example 2) where the noodle belt was strongly rolled out, the reconstitution property improves but does not improve dramatically. Moreover, as compared to the normal method (Comparative Example 1), in a case (Comparative Example 3) where the superheated steam was used, the dramatic improvement effect of the reconstitution property is observed. Further, in a case (Example 1) where the superheated steam and the strong rolling are combined, the reconstitution property dramatically improves. The thick noodles which cannot be reconstituted by the prior art can be reconstituted, and the taste and the texture are not adversely affected. Rather, the texture of the noodles improves although the texture of the noodles subjected to the superheated steam in Comparative Example 3 is a bit too soft. In the method of Example 1, if the time for reconstitution after the pouring of the boiling water is shortened for the noodles of 1.3 to 1.6 mm in thickness, the best reconstituted noodles may be obtained.

Experiment 2

Regarding the thickness of the reconstituted noodle of Example 1 of Experiment 1, an experiment of changing the rolling rate of the strong rolling performed in the noodle making step was performed.

To be specific, the noodle doughs each obtained by kneading with the mixer and having the same composition as in Example 1 were shaped to form the noodle belts each having a thickness of about 12 mm. As the first rolling, these noodle belts were rolled out at the rolling rates of 85%, 80%, 70%, 60%, and 55%, respectively. Further, these noodle belts, which were rolled out once at different rolling rates, were rolled out four more times at the rolling rate of 10 to 50% such that the thickness of the reconstituted noodle string became 1.8 mm.

For example, the noodle belt, which was rolled out once at the rolling rate of 80%, was weakly rolled out four more times such that the final thickness of the reconstituted noodle string became 1.8 mm.

The subsequent steps are the same as those in Example 1. The superheated steam was sprayed to the raw noodle strings obtained by cutting the noodle belts by the square blade No. 9. Next, the water supply by shower and the superheated steam spraying were repeated twice. Thus, the gelatinization was performed. Then, the noodle strings were subjected to the fry drying to obtain samples.

The reconstitution properties of the samples corresponding to the first rolling rates of 85%, 80%, 70%, 60%, and 55% were evaluated by five expert panelists in the same manner as in Experiment 1 by pouring 400 ml of boiling water to each sample and leaving each sample for five minutes. Table 2 shows the results.

TABLE 2

| Rolling rate | Thickness of reconstituted noodle | Reconstitution property | Comments |
|---|---|---|---|
| 85% | 1.8 mm | Best | Reconstitution property is excellent but noodles easily break. |
| 80% | 1.8 | Best | In best condition. |
| 70% | 1.8 | Best | Reconstitution property is excellent but the texture of noodle is slightly hard. |
| 60% | 1.8 | Good - | Cores are slightly hard but disappear a little later. |
| 55% | 1.8 | NG | Moisture does not reach the cores. |

Reference Experiment 1

A test for finding out whether or not the change in the rolling rate affects the gelatinization of the noodle string was performed by the following method. To be specific, the noodle dough obtained by kneading with the mixer and having the same compositions as in Example 1 was shaped to form the noodle belt having a thickness of about 12 mm. The noodle belt was strongly rolled out only once by the rolling machine at the rolling rate of 86% such that the thickness of the reconstituted noodle string became 1.8 mm. Moreover, another noodle belt having the thickness of 12 mm was rolled out five times at the rolling rate of about 10 to 50% such that the thickness of the reconstituted noodle string became 1.8 mm.

These noodle belts rolled out as above were cut by the square blade No. 9 cutting roll to obtain the noodle strings, and the noodle strings were subjected to the steaming by the saturated steam for 120 seconds. A moisture value of the steamed noodle string and a degree of gelatinization of the steamed noodle string were measured. The degree of gelatinization was measured by using a β-amylase pullulanase method (BAP method).

As a result, the noodle string which was strongly rolled out only once at the rolling rate of 86% has the average moisture content of 36% and the degree of gelatinization of 55%. Moreover, the noodle string which was rolled out five times at the rolling rate of 32% has the average moisture content of 37% and the degree of gelatinization of 48%.

It is understood from the above that the degree of gelatinization is accelerated by the strong rolling.

Experiment 3

To find out the influence of an alkaline agent added to the raw material in Example 1 of Experiment 1, the composition of the phosphate added in Example 1 was changed.

To be specific, 1 kg of the main raw material containing 750 g of the wheat flour and 250 g of the starch was prepared, and in the composition of the kneading water added to the main raw material, 5 g of the phosphate added in Example 1 was replaced with the following. That is, instead of the phosphate, each of 3 g of sodium carbonate, 3 g of trisodium phosphate (a small amount of acid agent was added for pH control), and 3 g of sodium polyphosphate, and 20 g of salt were dissolved in water to prepare three types of 430 ml of the kneading water. Each kneading water was added to the main raw material. The noodle doughs were obtained by adequately kneading respective kneading water with the mixer as with Example 1, and the obtained noodle doughs were shaped to form the noodle belts each having a thickness of about 12 mm.

As the first rolling, each of these noodle belts was strongly rolled out by the rolling machine at the rolling rate of 79%. Next, each of the noodle belts was rolled out four more times by the rolling machine at the rolling rate of about 10 to 50%, and the final thickness of each of the noodle belts was adjusted such that the thickness of the reconstituted noodle string became 1.8 mm. These noodle belts were cut by using the square blade No. 9 cutting blade roll to obtain the raw noodle strings. After that, samples of the instant fried noodles were prepared in the same manner as in Example 1. Then, as with Experiment 1, 400 ml of the boiling water was poured to each of the samples, and the samples were left for five minutes. The reconstitution properties of these samples were evaluated by five expert panelists. Table 3 shows the results.

TABLE 3

| Salt Used | Thickness of reconstituted noodle | Reconstitution property | Comments |
|---|---|---|---|
| Trisodium phosphate | 1.8 mm | Best | In best condition |
| Sodium polyphosphate | 1.8 | Best | In best condition |
| Sodium carbonate | 1.8 | Good - | Cores are slightly hard but disappear a little later |

Example 2

Gelatinization by Saturated Steam After Superheated Steam Spraying 430 ml of the kneading water in which 20 g of the salt and 5 g of the phosphate (monophosphate:polymer phosphate=2:3) were dissolved was added to 1 kg of the main raw material powder containing 750 g of the wheat flour and 250 g of the starch, and this mixture was adequately kneaded with the mixer to obtain the noodle dough. The obtained noodle dough was shaped to form the noodle belt having a thickness of about 12 mm.

As the first rolling, the noodle belt was strongly rolled out by the rolling machine at the rolling rate of 79%. Next, the noodle belt was rolled out four more times by the rolling machine at the rolling rate of about 10 to 50%, and the final thickness of the noodle belt was adjusted such that the thickness of the reconstituted noodle string became 1.8 mm. This noodle belt was cut by using the square blade No. 9 cutting blade roll to obtain the raw noodle strings.

While the raw noodle strings were being conveyed by the net conveyor, the superheated steam was sprayed to the noodle strings in the tunnel-shaped steam chamber. As the conditions of the superheated steam, the steam flow rate was 160 kg/h, and the temperature monitored by the temperature sensor disposed on the surface of the noodle string was about 140° C. After the superheated steam was sprayed to the noodle strings for 30 seconds in the steam chamber, the noodle strings were immediately discharged to the outside, and the moisture was supplied to the noodle strings by showering them with the 2% salt water of about 60° C. for 40 seconds.

Next, the noodle strings were immediately conveyed into a tunnel-shaped saturated steam chamber and subjected to the steaming at the steam flow rate of 240 kg/h and the temperature of about 100° C. for 30 seconds. Further, the noodle strings were discharged to the outside of the steam chamber, and the moisture was supplied to the noodle strings by showering them with the 2% salt water of about 60° C. Again, the noodle strings were immediately conveyed into the tunnel-shaped saturated steam chamber and subjected to the steaming at the steam flow rate of 240 kg/h and the temperature of about 100° C. for 30 seconds. Thus, the gelatinization was performed.

The noodle strings were immersed in the boiling chamber of 90° C. for five seconds and next immersed in the loosening liquid for five seconds. Then, the noodle strings were cut, and 150 g of the noodles as one meal were filled in the retainer having the capacity of 380 ml. Next, the noodles were fried in the palm oil of about 150° C. for two minutes to be dried. The instant fried noodles produced as above were cooled and stored as a sample of Example 2.

Five expert panelists evaluated the reconstitution property, texture, and the like of the sample by: putting the sample in a styrol cup container; pouring 400 ml of the boiling water to the container; covering the container and leaving it for five minutes; adequately mixing the noodles; and eating them.

As a result, the noodles of Example 2 were slightly harder than the noodles of Example 1 but were reconstituted. It was found that the improvement effect of the reconstitution property of the noodles of Example 2 is high even by using the saturated steam in the gelatinization step after the superheated steam spraying. However, the binding of the noodle strings was slightly observed, and loosening of the noodle strings tends to slightly deteriorate.

Example 3

Hot-Air Drying 430 ml of the kneading water in which 20 g of the salt and 5 g of the phosphate (monophosphate:polymer phosphate=3:2) were dissolved was added to 1 kg of the main raw material powder containing 750 g of the wheat flour and 250 g of the starch (150 g of acetylated starch and 100 g of oxidized starch), and this mixture was adequately kneaded with the mixer to obtain the noodle dough. The noodle dough was shaped to form the noodle belt having a thickness of about 12 mm.

Next, 430 ml of the kneading water in which 20 g of the salt and 5 g of the phosphate (monophosphate:polymer phosphate=3:2) were dissolved was added to 1 kg of the main raw material powder containing 750 g of the wheat flour and 250 g of the starch (250 g of the acetylated starch), and this mixture was adequately kneaded with the mixer to obtain the noodle dough. This noodle dough was shaped to form the noodle belt having a thickness of about 4.3 mm.

The former noodle belt having the thickness of 12 mm was used as an inner noodle belt, and the latter noodle belt having the thickness of 4.3 mm was used as an outer noodle belt. Three noodle belts that were the outer noodle belt, the inner noodle belt, and the outer noodle belt were stacked in this order to form a combined noodle belt having a thickness of about 13.5 mm.

As the first rolling, the combined noodle belt was strongly rolled out by the rolling machine at the rolling rate of 79%. Next, the combined noodle belt was rolled out four more times by the rolling machine at the rolling rate of 10 to 50%, and, the final thickness of the noodle belt was adjusted such that the thickness of the reconstituted noodle string became 1.9 mm. This combined noodle belt was cut by using the square blade No. 9 cutting blade roll to obtain the raw noodle strings.

While the raw noodle strings were being conveyed by the net conveyor, the superheated steam was sprayed to the noodle strings in the tunnel-shaped steam chamber. As the conditions of the superheated steam, the steam flow rate was 160 kg/h, and the temperature monitored by the temperature sensor disposed on the surface of the noodle string was about 140° C. After the superheated steam was sprayed to the noodle strings for 30 seconds in the steam chamber, the noodle strings were immediately discharged to the outside, and the moisture was supplied to the noodle strings by showering them with the 2% salt water of about 60° C. for 40 seconds.

Next, again, the noodle strings were immediately conveyed into the tunnel-shaped steam chamber, and the superheated steam was sprayed to the noodle strings at the steam flow rate of 160 kg/h and the temperature of about 140° C. for 30 seconds. Further, the noodle strings were discharged to the outside of the steam chamber, and the moisture was supplied to the noodle strings by showering the 2% aqueous solution of about 60° C. for 40 seconds. Again, the noodle strings were immediately conveyed into the tunnel-shaped steam chamber, and the superheated steam was sprayed to the noodle strings at the steam flow rate of 160 kg/h and the temperature of about 140° C. Thus, the gelatinization was performed.

The noodle strings were immersed in the boiling chamber of 90° C. for 15 seconds and next immersed in the loosening liquid for five seconds. Then, the noodle strings were cut, and 150 g of the noodles as one meal were filled in the retainer having the capacity of 470 ml. The noodles were dried by a hot air drier at 100° C. for 30 minutes with a wind speed of 3 m/min. The instant fried noodles produced as above were cooled and stored as a sample of Example 3.

Five expert panelists evaluated the reconstitution property, texture, and the like of the sample by: putting the sample in a styrol cup container; pouring 400 ml of the boiling water to the container; covering the container and leaving it for five minutes; adequately mixing the noodles; and eating them.

As a result, although the noodle strings were thick, that is, each had a thickness of 1.9 mm, they were reconstituted. In addition, the sample had no feeling of stiffness on the surface of the noodle string, the feeling of stiffness being specific to conventional hot-air dried noodles. The sample was excellent noodles having a raw noodle-like texture.

Example 4

Example in which the Saturated Steam was Also Used in the Superheated Steam Spraying 350 ml of the kneading water in which 20 g of the salt and 2 g of the brine water (sodium carbonate:potassium carbonate=1:1) were dissolved was added to 1 kg of the main raw material powder containing 880 g of the wheat flour and 120 g of the starch. This mixture was adequately kneaded with the mixer to obtain the noodle dough. The noodle dough was shaped to form the noodle belt having a thickness of about 12 mm.

As the first rolling, the noodle belt was strongly rolled out by the rolling machine at the rolling rate of 79%. Next, the noodle belt was rolled out four more times by the rolling machine at the rolling rate of about 10 to 50%, and the final thickness of the noodle belt was adjusted such that the thickness of the reconstituted noodle string became 2.0 mm. The noodle belt was cut by a No. 18 round blade roll to obtain the raw noodle strings.

While the raw noodle strings were being conveyed by the net conveyor, the superheated steam was sprayed to the noodle strings in the tunnel-shaped steam chamber. The steam chamber has a saturated steam emission hole. The superheated steam was sprayed to the noodle strings with the inside of the steam chamber filled with the saturated steam. As the conditions of the superheated steam, the steam flow rate was 110 kg/h, and the temperature monitored by the temperature sensor disposed on the surface of the noodle string was about 130° C. The flow rate of the saturated steam was 50 kg/h. As above, after the superheated steam was sprayed to the noodle strings for 30 seconds with the inside of the steam chamber filled with the saturated steam, the noodle strings were discharged to the outside, and the moisture was supplied to the noodle strings by showering them with hot water of about 60° C. for 30 seconds.

Next, again, the spraying of the superheated steam in the steam chamber in which the saturated steam was filled was performed under the same conditions as above, and then the noodle strings were showered with the hot water for 30 seconds in the same manner as above.

Next, the noodle strings were immediately conveyed into the tunnel-shaped saturated steam chamber and subjected to the steaming at the steam flow rate of 240 kg/h and the temperature of about 100° C. for 30 seconds.

The noodle strings were immersed in lightly-salted water for five seconds to be seasoned. Then, the noodle strings were cut, and 190 g of the noodles as one meal were filled in the retainer having the capacity of 400 ml. The noodles were dried by the fry drying in the palm oil of 150° C. for two minutes. The instant fried noodles produced as above was cooled and stored as a sample of Example 4. For comparison with Example 4, the instant fried noodles were produced as a comparison sample by the same producing method as in Example 4 except that the normal rolling was performed instead of the strong rolling.

The sample of Example 4 and the comparison sample were respectively put in the styrol cup containers, and 470 ml of the boiling water was poured to each container. The samples were left for three minutes. Then, the reconstitution property of each sample and the texture of each sample three minutes later were evaluated by five expert panelists.

As a result, the reconstitution property of the sample of Example 4 was more excellent than that of the comparison sample. In addition, the texture of the sample of Example 4 was not too soft and was further preferable.

The invention claimed is:

1. A method for producing instant noodles, comprising:
   (a) cutting a noodle belt to obtain raw noodle strings, the noodle belt being rolled out once or more at a rolling rate of 60% or higher;
   (b) spraying superheated steam to the obtained raw noodle strings, wherein a temperature of the superheated steam is 125 to 220° C. as the temperature to which surfaces of the noodle strings are exposed;
   (c) performing gelatinization of the noodle strings after (b), wherein gelatinization comprises one of:
      supplying moisture in liquid form to the noodle strings after (b) to increase a moisture content of the noodle strings, and heating the noodle strings by saturated steam to realize the gelatinization; and
      supplying the moisture in liquid form to the noodle strings after (b) to increase the moisture content of the noodle strings, and heating the noodle strings by the superheated steam, and repeating one or more treatments, in which the moisture in liquid form is supplied to the noodle strings to increase the moisture content of the noodle strings and the noodle strings are heated by the superheated steam or the saturated steam, to realize the gelatinization; and
   (d) drying the noodle strings after the gelatinization.

2. The method according to claim 1, wherein the saturated steam is also used when the superheated steam is used in (b) or (c).

3. The method according to claim 1, wherein a time for spraying the superheated steam to the noodle strings is 5 to 50 seconds.

4. The method according to claim 1, wherein the noodle belt in (a) contains phosphate and/or carbonate.

5. The method according to claim 2, wherein a time for spraying the superheated steam to the noodle strings is 5 to 50 seconds.

6. The method according to claim 2, wherein the noodle belt in (a) contains phosphate and/or carbonate.

7. The method according to claim 3, wherein the noodle belt in (a) contains phosphate and/or carbonate.

8. The method according to claim 5, wherein the noodle belt in (a) contains phosphate and/or carbonate.

* * * * *